(12) United States Patent
McDonald

(10) Patent No.: US 6,480,108 B2
(45) Date of Patent: *Nov. 12, 2002

(54) METHOD AND APPARATUS FOR TRACKING AND LOCATING A MOVEABLE ARTICLE

(75) Inventor: Glenn McDonald, Alexandria, VA (US)

(73) Assignee: The United States of America as represented by the United States Postal Service, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/823,984

(22) Filed: Apr. 3, 2001

(65) Prior Publication Data

US 2001/0040513 A1 Nov. 15, 2001

Related U.S. Application Data

(63) Continuation-in-part of application No. 09/317,406, filed on May 24, 1999, now Pat. No. 6,211,781.

(51) Int. Cl.$^7$ ............................................. G08B 29/00
(52) U.S. Cl. ..................... 340/505; 340/539; 340/571; 340/572.1; 340/573.1; 340/825.36; 340/825.49; 340/825.72
(58) Field of Search ................................ 340/505, 539, 340/568.1, 571, 572.1, 573.1, 825.36, 825.49, 825.72

(56) References Cited

U.S. PATENT DOCUMENTS

| | | | | |
|---|---|---|---|---|
| 4,839,813 A | * | 6/1989 | Hills et al. | 705/404 |
| 5,313,051 A | * | 5/1994 | Brigida et al. | 235/375 |
| 5,682,142 A | * | 10/1997 | Loosmore et al. | 340/572.1 |
| 5,917,425 A | * | 6/1999 | Crimmins et al. | 340/825.49 |
| 6,211,781 B1 | * | 4/2001 | McDonald | 340/505 |

* cited by examiner

Primary Examiner—Daryl Pope
(74) Attorney, Agent, or Firm—Finnegan Henderson Farabow Garrett & Dunner, LLP

(57) ABSTRACT

Tracking of an article through geographic areas using electromagnetic signals, specifically radio frequency (RF) signals. The article contains a tag operating as a transmitter and receiver. Tag-readers in the defined geographic areas transmit RF signals and in response, the tag transmits RF signals received by the tag-reader. By knowing the areas in which the tag-readers are located, a system tracks the article by monitoring the tag-readers communicating with the tag.

12 Claims, 17 Drawing Sheets

— 1 —

METHOD AND APPARATUS FOR TRACKING AND LOCATING A MOVEABLE ARTICLE

Cross-Reference to Related Applications

This application is a continuation-in-part application of application Ser. No. 09/317,406, filed May 24, 1999, now U.S. Pat. No. 6,211,781, hereby incorporated by reference.

BACKGROUND OF THE INVENTION

1. Field of the Invention

The present invention relates to an apparatus and method for tracking a moveable article, and in particular, to tracking a mail piece through a mail delivery system.

2. Description of the Related Art

Postal customers increasingly demand quick delivery times and expect that mail will be delivered on-time. As a result, overnight and similar forms of mail delivery are increasingly important. In order to meet these needs and expectations, postal services must provide internal systems that monitor operations to identify systemic and individual problems that can occur during mail delivery.

Traditionally, tracking mail involves recording a mail piece's mailing date and delivery date. The mailing date is compared to the delivery date to determine the amount of time the mail piece spent in transit. This method determines the overall time for delivery, but does not permit tracking of mail during mail processing and delivery. If the mail piece does not reach its destination within a required number of days, this method cannot determine what caused the delay.

For instance, the traditional method cannot pin-point bottlenecks that slow down mail delivery. The traditional method cannot locate specific pieces of mail intended for a particular truck to ensure timely loading of the mail piece on the proper truck. The traditional method also cannot indicate when a mail piece is in an area where it should not be. Further, the traditional method cannot indicate when a mail piece is behind schedule or off a planned track. Lastly, the traditional method can not indicate when a mail piece has not moved for an extended period of time.

Accordingly, a need exists for tracking a mail piece as it travels through the mail delivery system.

SUMMARY OF THE INVENTION

The advantages and purpose of the invention are set forth in part in the description which follows, and in part are obvious from the description, or may be learned by practice of the invention. The advantages and purpose of the invention are realized and attained by means of the elements and combinations particularly pointed out in the appended claims.

To attain the advantages and in accordance with the purpose of the invention, as embodied and broadly described herein, the invention comprises a method and apparatus for tracking and locating a moveable article. Methods and apparatus consistent with this invention transmit an interrogation signal; receive the interrogation signal in the article; transmit a response signal from the article, the response signal providing a unique identification code; receive the response signal using a receiver having a unique receiver code; and generate an identification signal providing an indication of the identification code and the receiver code.

Methods and apparatus consistent with this invention may also provide a separate receiver within each of a plurality of sectors, provide a separate transmitter within each of the plurality of sectors, transmit a separate interrogation signal from each of the provided transmitters and receive the response signal using one or more of the provided receivers.

Methods and apparatus consistent with this invention may also repeat the interrogation signal transmitting step, the response signal transmitting step, the response signal receiving step, and generate a plurality of identification signals. The above method or apparatus may also record the identification signals in real-time over a period of time to track the location of the article through the sectors.

It is understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In the specification.

DESCRIPTION OF THE INVENTION

Reference is now made in detail to the present exemplary embodiments of the invention, examples of which are illustrated in the accompanying drawings. Wherever possible, the reference numbers are used throughout the drawings to refer to the same or like parts.

Apparatus and methods consistent with this invention track and determine a location of a mail piece using electromagnetic energy, such as radio frequency (RF) energy. The mail piece is fitted with a tag, which operates as a receiver and a transmitter. Within an area, devices known as tag-readers transmit interrogation signals, which are received by the tag. The tag may be affixed to or contained within the mail piece. Upon receiving the interrogation signal, the tag transmits a response signal containing a unique identification code and possibly other preprogrammed data. This identification code and other preprogrammed data, in turn, may identify the mail piece affixed to the tag. Therefore, by using multiple tag-readers over an area, a system may track and determine the location of the mail piece affixed to the tag. This area may include the extensive areas of the mail delivery process, which may be any place in or around where the mail piece travels, such as a building, truck, delivery platform, or mail route. The area may even include places where mail should not be, such as an employee locker room, bathroom, etc.

Figure 1:
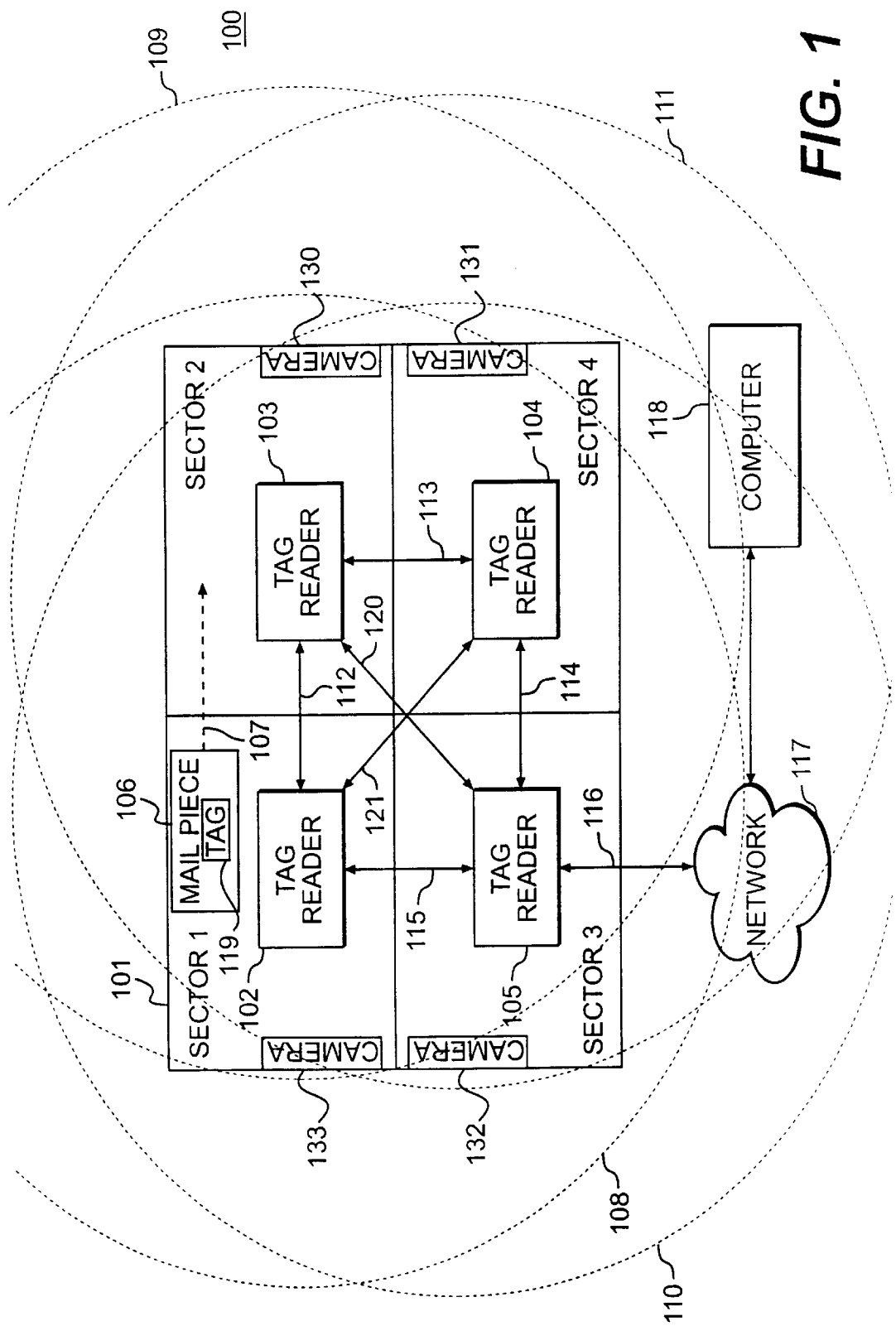
FIG. 1 is a diagram of an apparatus, consistent with this invention, for tracking and locating a mail piece.

FIG. 1 is a diagram of a system consistent with this invention for tracking and locating mail piece 106. In this system, mail piece 106 is tracked through an area 101. Area 101 is divided into four sectors, each sector having its own tag-reader, including a tag-reader 102 for sector 1, a tag-reader 103 for sector 2, a tag-reader 105 for sector 3, and a tag-reader 104 for sector 4. Each tag-reader 102–105 transmits an interrogation signal, which may extend beyond its own sector. In particular, tag-reader 102 transmits a separate interrogation signal having an effective range 108; tag-reader 103 transmits an interrogation signal having an effective range 109; tag-reader 104 transmits an interrogation signal having an effective range 111; tag-reader 105 transmits an interrogation signal having an effective range 110. Although sectors 1–4 do not overlap in FIG. 1, multiple tag-readers may be placed such that sectors are defined to overlap. Area 101 also includes the cameras 130–133, which are explained in detail below.

In one embodiment, each sector is covered by the effective transmission range of at least three tag-readers. For instance, sector 1 is covered by the transmission pattern 108 of tag-reader 102, the transmission pattern 109 of tag-reader 103, and the transmission pattern 110 of tag-reader 105. In this fashion, the location of the mail piece may be determined using triangulation, as described below. Also in this embodiment, the transmission patterns of tag-readers 102–105 is approximately 300 feet indoors. This distance may vary depending upon objects in the sector, or the user's preference.

Figure 2:
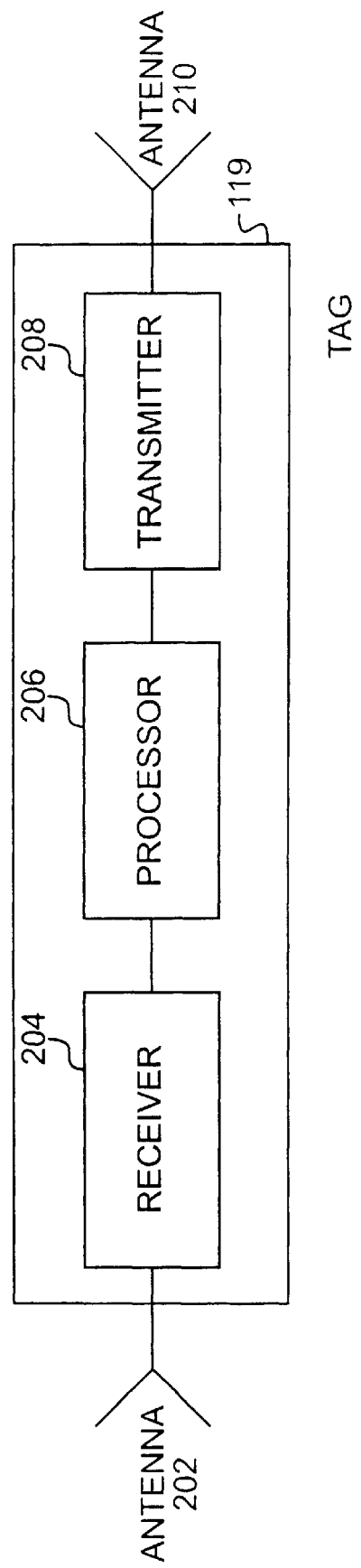
FIG. 2 is a diagram of a transmit and receive device ("tag"), consistent with this invention, that may be attached to a mail piece to aid in tracking the mail piece.

FIG. 2 shows the components of a tag, such as tag 119. Tag 119 contains a receiver 204, a processor 206, and a transmitter 208. Tag 119 is connected to antennas 202 and 210. The interrogation signal from the tag-reader 104 is received by tag receiver 204 from antenna 202 and processed by processor 206. When processor 206 determines that it received an interrogation signal from a tag-reader, processor 206 instructs transmitter 208 to transmit a response signal via antenna 210. The response signal contains the unique identification code ("tag code") of tag 119. Although the tag of FIG. 2 includes separate transmit and receive antennas, those skilled in the art recognize that a single antenna could be used with appropriate transmit/receive switching circuitry. In one embodiment, it is possible that tag 119 does not have a receiver. In this instance, tag 119 would transmit a response signal periodically. Tag 119 may comprise a memory to store the identification code and other preprogrammed data.

Figure 3:
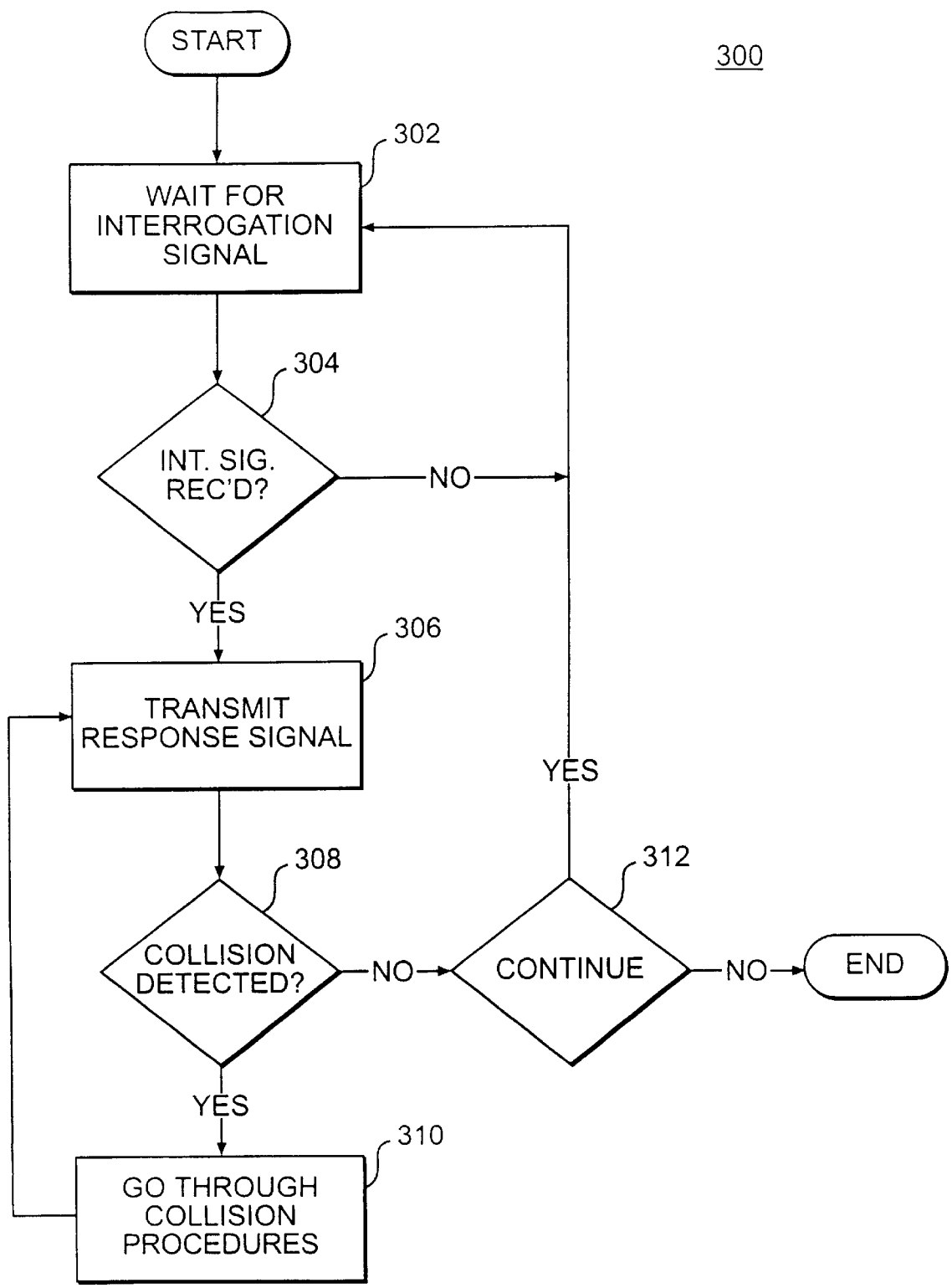
FIG. 3 is a flow chart of a tag process consistent with this invention.

FIG. 3 shows a process 300 that tag 119 performs in processor 206. Tag 119 waits for an interrogation signal (step 302) to be received by receiver 204. If tag 119 does do not receive an interrogation signal (step 304), tag 119 continues to wait (step 302). If tag 119 does receive an interrogation signal (step 304), then a response signal is transmitted by transmitter 208. If a collision, that is, a simultaneous transmission by two or more tags or tag readers, is detected (step 308), then tag 119 goes through the appropriate collision handling procedures (step 310) and retransmits the response signal (step 306). Collision may be the result of multiple tags turning on, i.e., "waking up," and trying to communicate simultaneously with one tag reader on the same frequency. Collision procedures are discussed below in greater detail. If a collision is not detected (step 308), then the process 300 repeats and waits for an interrogation signal (step 302).

Figure 4:
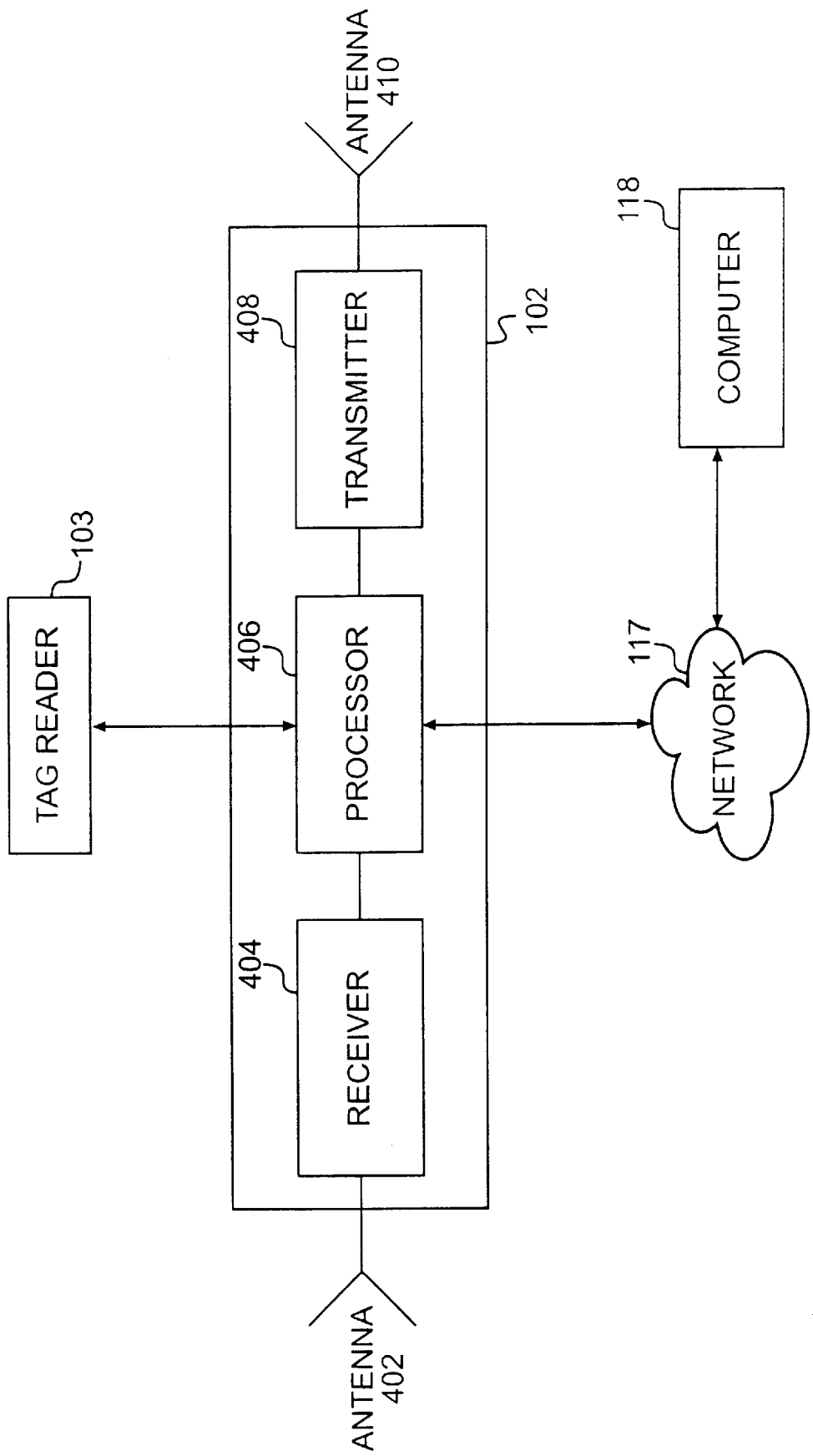
FIG. 4 is a diagram of a transmit and receive device ("tag-reader"), consistent with this invention, that may be attached to a fixed wall or may be mobile.

FIG. 4 shows the components of a tag-reader, such as tag-reader 102. Tag-reader 102 contains a receiver 404, a processor 406, and a transmitter 408. Transmitter 408 transmits an interrogation signal, which may be received by a tag, such as tag 119. Receiver 404 receives response signals from tags. Processor 406 instructs transmitter 408 when to transmit an interrogation signal to the tags, and processes the response signal and any other signals from receiver 404. Tag-reader 102 interacts with a network 117 and possibly other tag-readers, such as tag-readers 103-105. Tag-reader 102 may communicate with other tag-readers by wireline or wireless communications. Tag-reader 102 sends an information signal to network 117, which includes the tag code, a tag-reader code, and other information such as the date and time the tag-reader received the response signal. The tag-reader code uniquely identifies the tag-reader.

Alternatively, it is possible to put tag-reader transmitter 408 and tag-reader receiver 404 in different locations, i.e. not in the same casing. Further, it is possible to have multiple receivers for every transmitter 408. Further still, it is possible to have multiple transmitters for every receiver 404.

Figure 5:
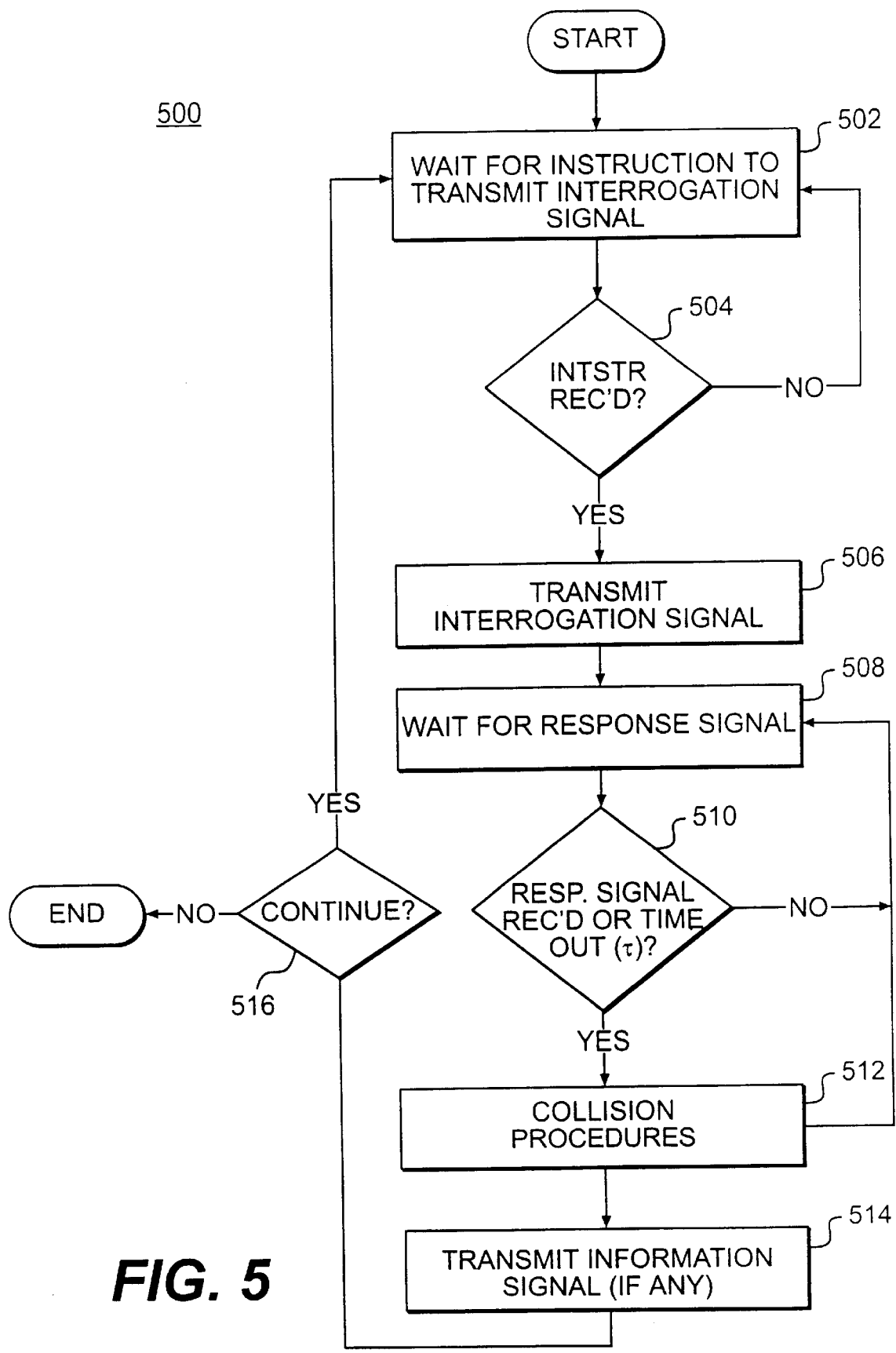
FIG. 5 is a flow chart of an exemplary tag-reader process consistent with this invention.

FIG. 5 shows a process 500, which is executed in tag-reader processor 406. Tag-reader 102 waits to be instructed to transmit an interrogation signal (step 502). This instruction may come from network 117 or may be generated by a clock or software in tag-reader 103. If tag-reader 102 does not receive an instruction (step 504), then tag-reader 102 continues to wait (step 502). If tag-reader 102 receives an instruction, then tag-reader 102 transmits an interrogation signal (step 506) through transmitter 408. Tag-reader 102 then waits for a response signal (step 508) from tag 119. If a response signal is received, or if there is a time-out (step 510), then tag-reader 102 runs collision procedures, if necessary (step 512). In one embodiment, the time-out may range from a few micro seconds to a few seconds. Tag-reader 102 transmits an information signal to computer 118 through network 117 if response signal is received. Then the process 500 may start again. Alternatively, processor 406 is programmed to periodically transmit an interrogation signal without waiting for an instruction.

In another embodiment, tag reader 102 may continuously broadcast on one frequency to tag 119, and tag 119 may communicate with tag reader 102 on a different frequency. In this embodiment, an instruction to transmit an interrogation signal may be omitted, and process 500 may begin at step 506.

Tag-readers 102–105 can be placed on a wall, mounted in a vehicle, or held in hand. The link between the tag-reader 102 and network 117 may be a wireline or wireless link. In the case where the tag-reader is hand held or otherwise portable, the link may be wireless. The transmission pattern of communication signals between tag-reader 102 and tag-readers 103–105 is not shown, and is not necessarily the same as transmit patterns 108–111 of interrogation signals. Tag readers, particularly hand-held and vehicle mounted tag readers, may contain memory and storage modules for storing data when communication to network 117 is not immediately possible.

In the one embodiment, tag-readers 102–105 and tag 119 are devices manufactured by ID Systems, Inc., such as the FLEXTAG™ system. Preferably, RF signals between a tag and tag-reader are at a frequency of 902–928 MHz, but other frequencies are possible.

If other tags transmit response signals at the same time as tag 119, then it is possible that there may be radio interference, also known as a collision, such that tag-reader 102 cannot discern and receive the response signals. The problem of collision can be resolved, however, by well known protocols.

The ALOHA protocol is an example of one possible protocol. Using this protocol, the tag 119 waits for an acknowledgment signal from a tag-reader, such as tag-reader 102, indicating that the response signal was accurately received. If tag 119 does not receive an acknowledgment signal within a specific timeout period, tag processor 406 assumes that the response signal collided with another tag's response signal. In this case, processor 406 schedules a retransmission of the response signal after a random delay time. This process continues until tag 119 receives an acknowledgment signal.

In the one embodiment, an algorithm similar to ALOHA is used but with "frequency hoping" in the 902–908 MHz frequencies. In effect, this multiplies the ALOHA one-channel method by a factor equal to the number of channels used. In this embodiment, each tag does not immediately transmit a response signal. Instead, each tag chooses a random time slot to transmit.

For instance, if the response signal is 50 bytes and the tag transmission rate is 1 Mbyte per second, then there are 20,000 time slots (1Mbyte divided by 50 bytes) in a one second period.

Each tag randomly selects one of the 20,000 time slots and transmits during its chosen time slot.

If the tag does not receive an acknowledgment then it selects another time slot and retransmits.

In this embodiment, one second (corresponding to 20,000 time slots) is sufficient to avoid collision between tags in the mail system and enough time to allow a response when mail is moving in and out of sectors.

In accordance with this invention, locating the mail piece in a defined area may include repeating the interrogation signal transmitting step, the response signal transmitting step, the response signal receiving step, and generating a plurality of information signals. In FIG. 1, mail piece 106 is affixed to tag 119. As mail piece 106 moves throughout the sectors as shown by line 107, tag 119 communicates with various tag-readers 102-105. Each tag-reader, such as tag-reader 102, transmits multiple interrogation signals over a period of time. Thus, tag 119 transmits a response signal after it receives each interrogation signal. Tag-reader 102, or tag-readers 103–105, depending on where tag 119 is, receives the periodic response signal and creates multiple information signals as time progresses.

Figure 6:
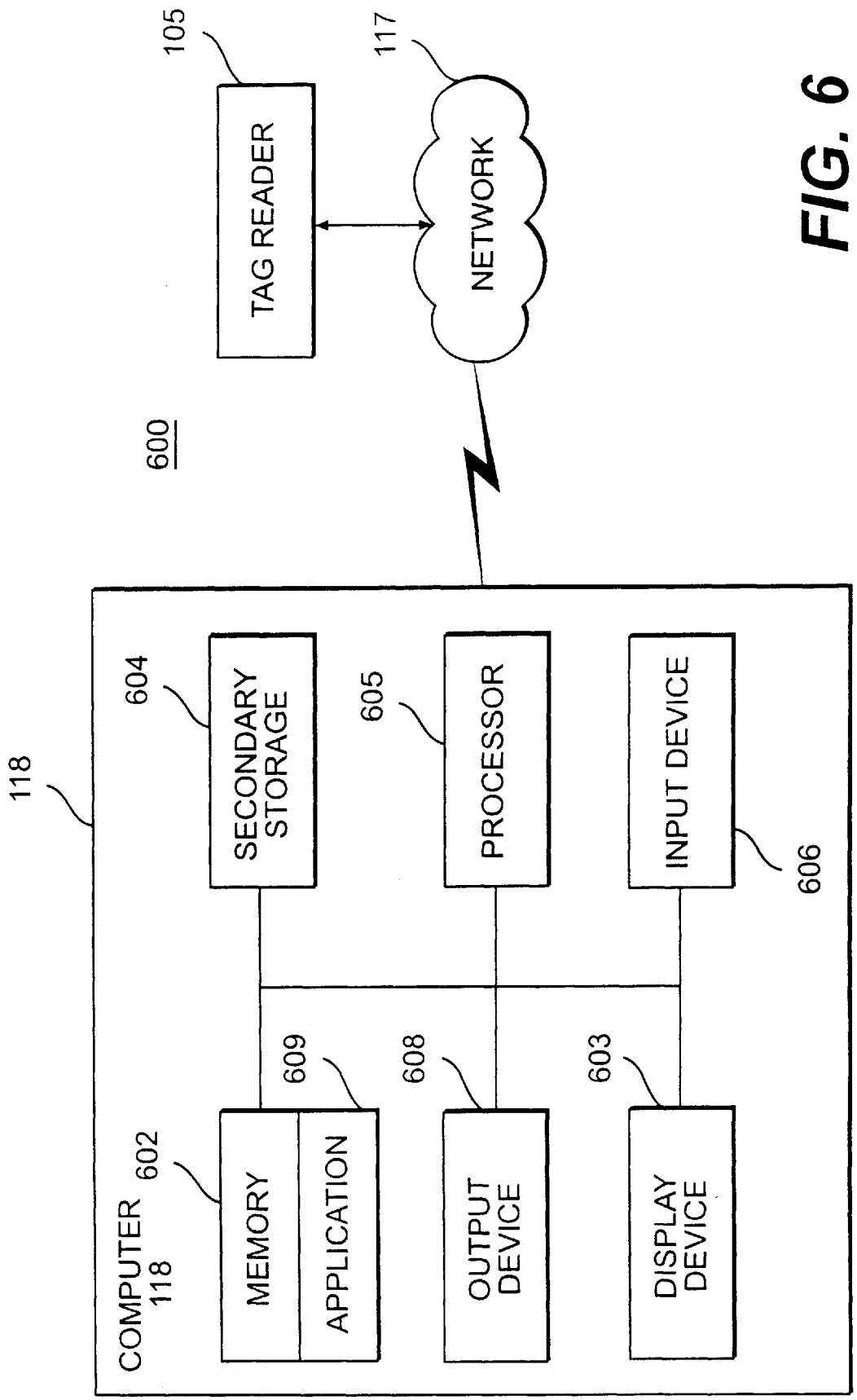
FIG. 6 is a diagram of a data processing system, consistent with this invention, for use in tracking of a mail piece.

FIG. 6 is a diagram of a data processing system, consistent with this invention, for use in tracking and locating the mail piece. Computer 118 includes a memory 602, a secondary storage device 604, a processor 605 such as a central processing unit, an input device 606, a display device 603, and an output device 608 such as a printer or CRT. Memory 602 and secondary storage 604 may store application programs and data for execution and use by processor 605. In particular, memory 602 stores an application 609 used to track mail piece 106.

Computer 118 instructs tag-readers 102–105 when to transmit an interrogation signal.

Figure 7:
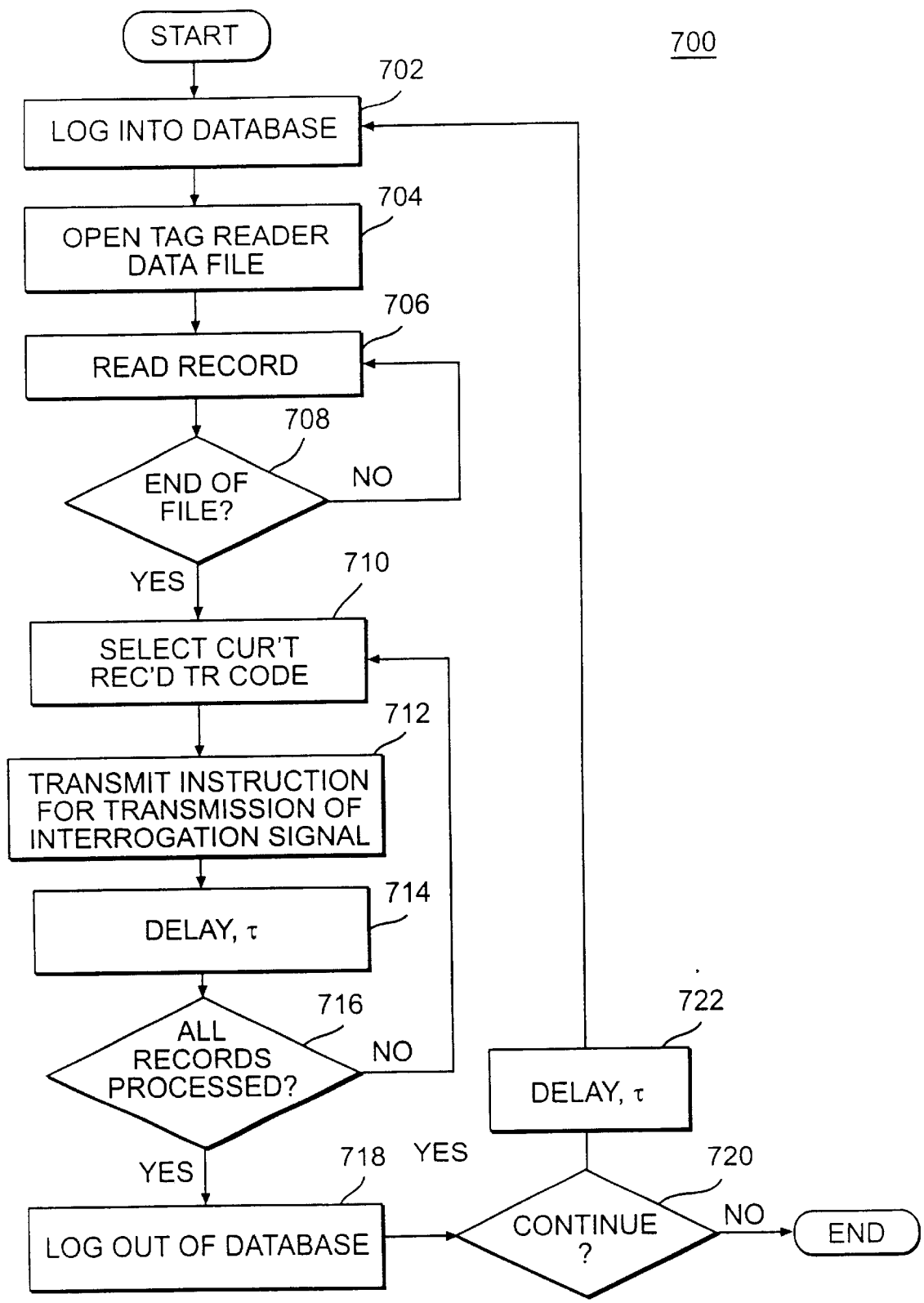
FIG. 7 is a flow chart of a process, consistent with this invention, for repeating the interrogation signal transmitting step with a plurality of tag-readers.

Preferably, computer 118 cycles through tag-readers in order to reduce interference between interrogation signals and response signals. FIG. 7 is a flow chart of a process, consistent with this invention, for repeating the interrogation signal transmitting step with a plurality of tag-readers. Process 700 may be implemented by a system including application 609 controlling operation of processor 605 in computer 118. In process 700, which is part of application 609, the system logs into a database (step 702), such as an Oracle7 database, which may be stored in memory 602 or secondary storage 604. The system opens a tag-reader data file (step 704), and reads a record from the data file (step 706). If it is not at the end of a file (step 708), the system continues to read the next record (step 706).

If the system is at the end of the data file (step 708), it selects the current record's tag-reader code (step 710) and instructs that tag-reader to transmit an interrogation signal (step 712). The system then waits (for a period tau) for that tag-reader to return information signals (step 714). This delay allows each tag-reader to transmit without interference from other tag-readers, and gives tags a chance to respond to the tag-reader. If all records are not processed (step 716), then the system moves to the next tag-reader code, which becomes the current tag-reader code (step 710). If all the records are processed (step 716), then the system logs out of the database (step 718), and the system determines if it wants to cycle through all the tag-readers again (step 720). If the system does cycle through the all the tag-readers again, then it delays (step 627) for the same reasons it delayed previously in step 716.

Methods and apparatus consistent with this invention may transmit the information signal through a network. The information signal contains the tag code of the tag that transmitted a response signal and the tag-reader code of the tag-reader that received the response signal. The information signal may also contain the date and time the tag-reader received the response signal.

In the illustrated embodiment, tag-readers typically communicate with each other as shown by lines 112–115 and 120–121 (FIG. 1) representing communication links between tag-readers 102–105. If a tag-reader is portable, it can either have a wireless link to network 117, or it can up-link to network 117 periodically. One of the tag-readers, in this example tag-reader 105, is connected via a link 116 through network 117 to a computer 118. Tag-reader 105 thus transmits to computer 118 information signals from tag-readers 102–105 concerning mail piece 106. Alternatively, each tag-reader 102–105 may connect directly or indirectly to computer 118. Network 117 may comprise a wired network such as the Internet or an intranet, or any equivalent network such as a wide area network, a local area network, or a public or private wireless network. Also, network 117 may represent, for example, a wireline, telephone line, or an intranet. Many buildings are already wired for intranets and have convenient connection locations. Therefore, it may be convenient to connect a tag-reader through an intranet to computer 118 rather than using separate wireline connections. Tag-readers 102–105 may be connected to the network in many different ways. For instance, tag-readers 102–105 may each have an Ethernet interface by which they connect directly to network 117.

Methods and apparatus consistent with this invention for locating the mail piece may record the information signals in real-time over a period of time to track the location of the mail piece through the sectors in real-time. In the illustrated embodiment, as tag-readers transmit interrogation signals and collect response signals, information signals are immediately forwarded through network 117 to computer 118. Computer 118 stores these information signals in a database, such as Oracle7. The database also contains a look-up table that associates each tag code with a particular mail piece, and the database also contains a look-up table that associates each tag-reader code with a physical location. The look-up table may also associate each tag code with other preprogrammed information, such as a destination zip code for example. Using the database, a user can view the location of any mail piece at any time, or replay the location history of the mail piece. Computer 118 tracks multiple mail pieces by assigning unique tag code to each tag and unique tag-reader code to each tag-reader. As described below, computer 118 may analyze the location, or location history of the mail pieces and generate error signals when appropriate.

Figure 9:
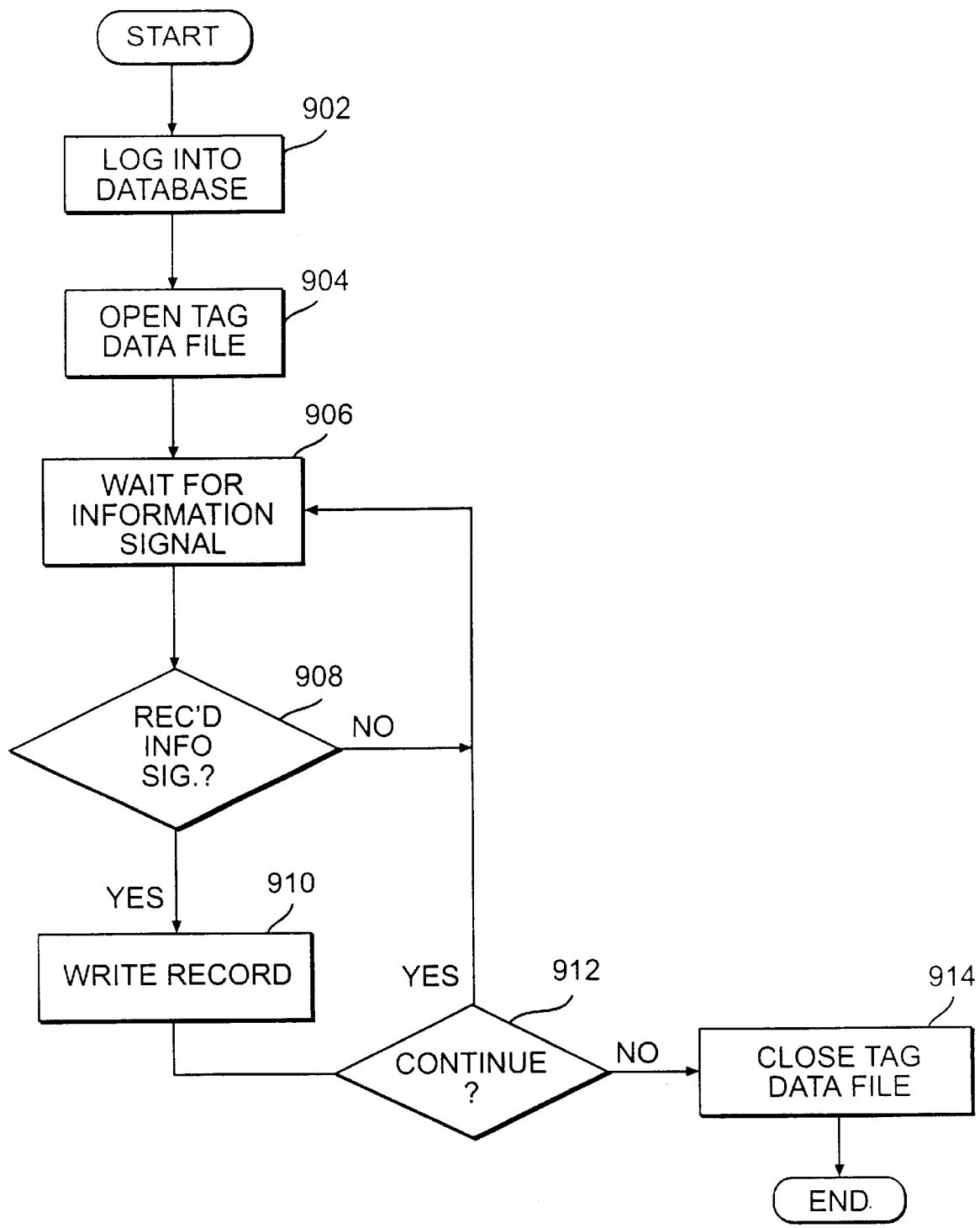
FIG. 9 is a flow chart of an information signal collection and storing process, consistent with this invention.

FIG. 9 is a flow chart of an information signal collection and storing process 900, consistent with this invention. Process 900 is implemented by a system including application 609 controlling operation of processor 605 in computer 118. In process 900, the system logs into a data base (step 902), such as Oracle7, and opens a tag data file (step 904). Memory 602 or secondary storage 604 may store the database. The system then waits for information signals (step 906) from tag-readers, such as tag-readers 102–105 that are delivered through network 117. If an information signal is not received (step 908), then the system continues to wait. If an information signal is received (step 908), then the system writes a record to the data base (step 910). The record contains three fields, possibly more: the tag code, the tag-reader code, and the time the response signal was received by the tag-reader. A fourth field could contain information about the mail piece associated with the tag code.

Figure 10A:
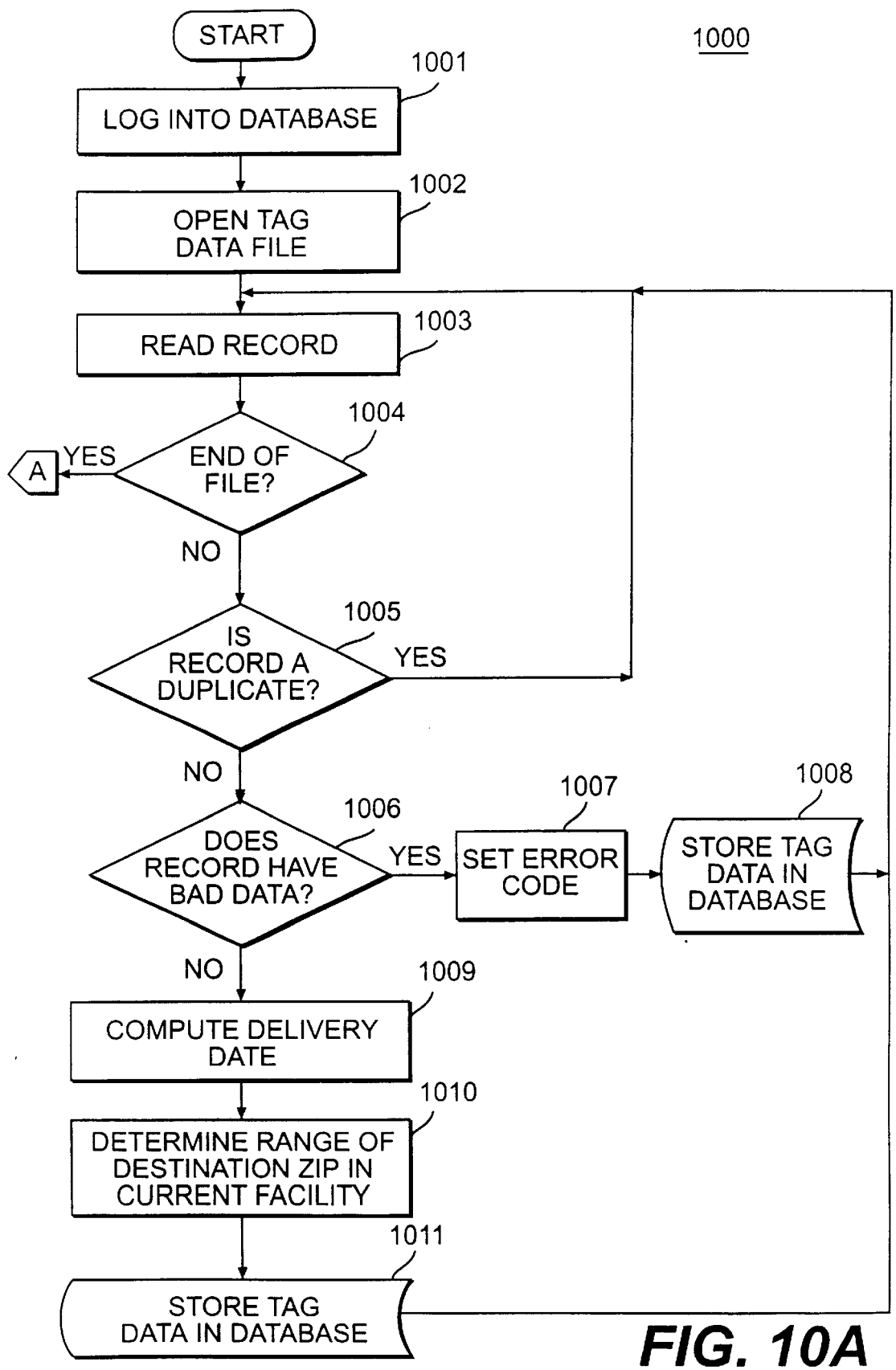
FIGS. 10A–10C are flow charts of a process, consistent with this invention, for tracking a mail piece.
Figure 10B:
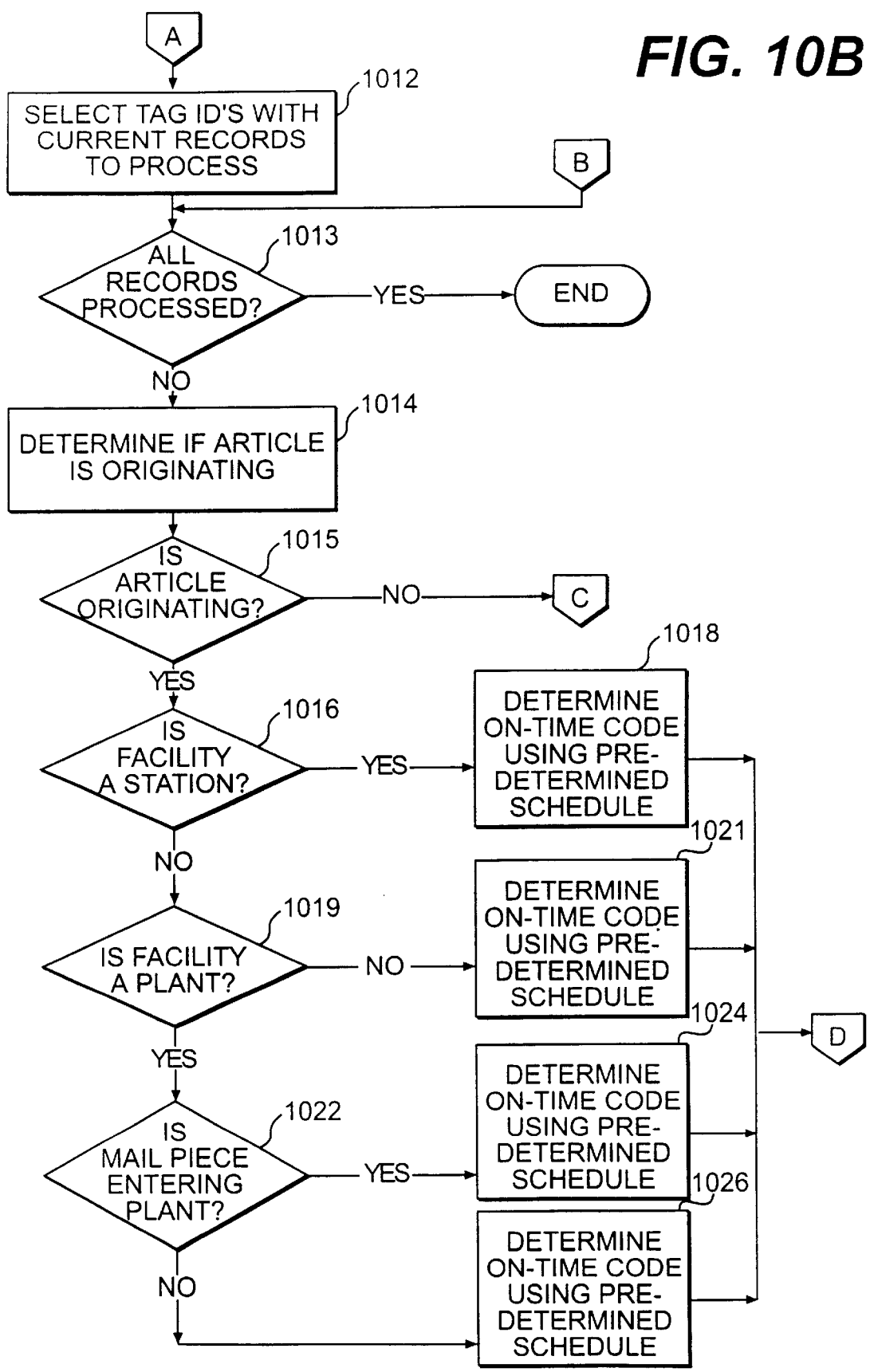
Figure 10C:
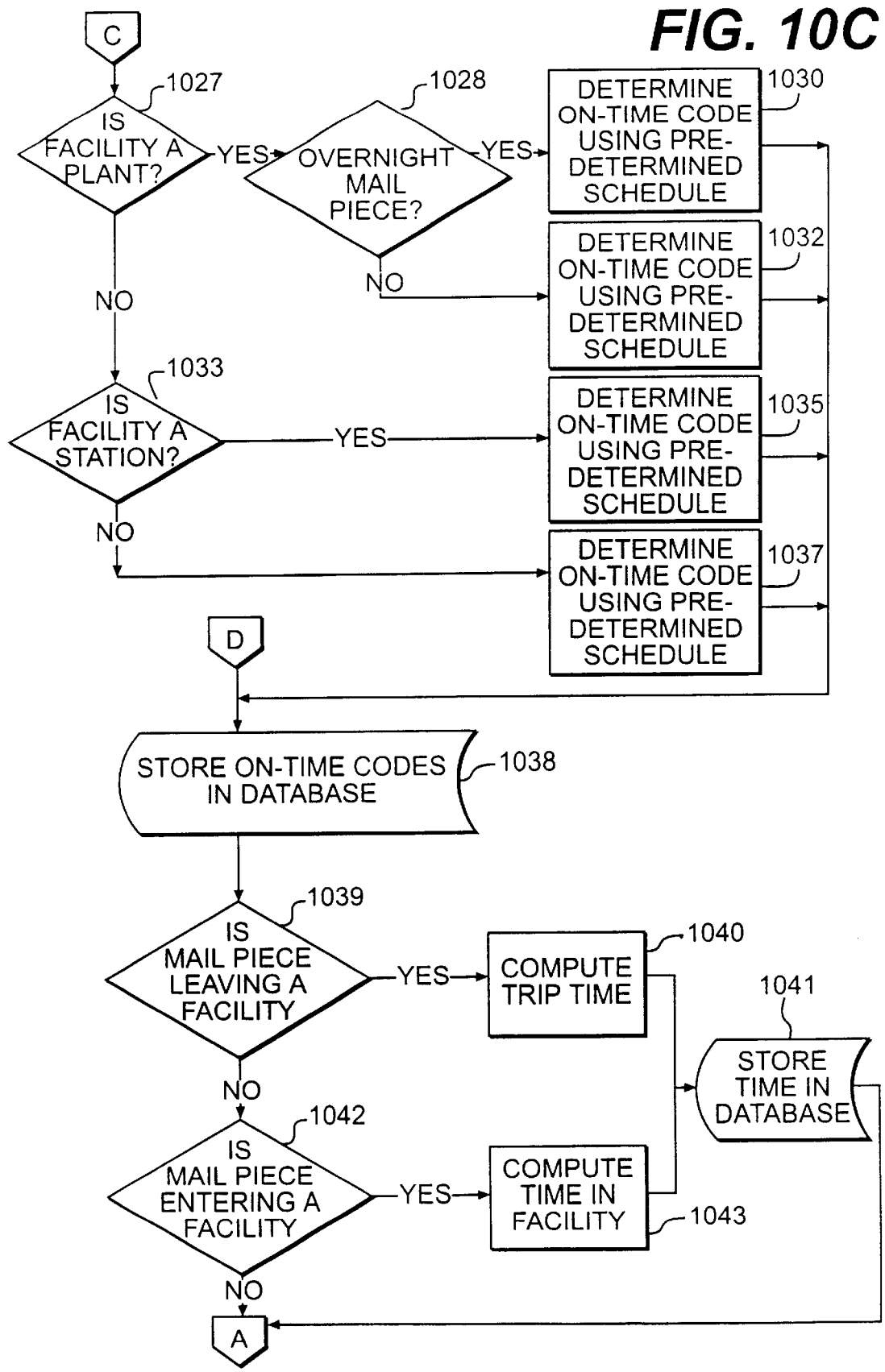

FIGS. 10A–10C are flow charts of a process for processing information collected in process 900. Process 1000 provides for real-time tag database viewing, and may be implemented by a system including application 609 controlling operation of processor 605 in computer 118.

In process 1000, the system logs into a database (step 1001), such as an Oracle7 database, which is stored in memory 602 or secondary storage 604.

In one embodiment, the computer that executes process 1000 is in a mail "facility." For example, in the United States Postal Service (USPS), there are three types of facilities that process mail pieces. First, in any geographical area there are "plants," also known as Processing & Distribution Centers (PDCs). All mail is sent to a plant where stamps are canceled and the mail is aggregated for distribution. Second, there are "stations," which are commonly known as local post offices. There may be multiple stations in one geographical area assigned to a plant. Third, the facility could be an airport mail center (AMC), which distributes mail to airline contractors. In one embodiment, the information signal generated by a tag reader may contain information regarding the tag reader including (1) the plant, AMC, or station the tag reader is in, (2) the tag reader's zip code, or (3) the date and time from the tag reader's internal clock.

In process 1000, the system opens a tag data file (step 1002), and reads a record from the data file (step 1003). It determines if it is at the end of the data file (step 1004), and if so, it executes step 1012. If it is not at the end of a file, the system determines if the record is a duplicate (step 1005). If so, it returns to step 1003 to read another record.

If the system is not at the end of the file, it may next determine if the record has erroneous data (step 1006). If so, the system sets an error code (step 1007) and stores the tag data in the database (step 1008). If the record does not have erroneous data, the system computes a projected delivery date (step 1009). The projected delivery date is the date the mail piece should be delivered to the customer. For instance, the USPS should deliver all first-class mail pieces within one, two, or three days after they are placed in the Postal Service.

In step 1010, the system determines the service area of the current facility. The service area is a list of zip codes serviced by the facility. The system then stores the delivery data and service area in the database (step 1011).

If the system is at the end of the file (step 1004), the system selects tag identifications with current records to process (step 1012). If a record remains to be processed (step 1013), the system determines if the mail piece is "originating" (step 1015). The mail piece may be originating when two conditions are met. The first condition is whether the mail piece is inducted into the mail system the same day that it is first detected. The second condition is whether the mail piece's originating zip code is the zip code that the facility serves, i.e. if it is in the service area.

If the mail piece is originating (step 1015) and the facility is a station (step 1016), then the system determines an "on-time" code (step 1018). The on-time code is either (1) "on-time," (2) "late," (3) "ready," or (4) "dead." The system determines this code by comparing the current status of the mail piece against a predetermined schedule. The predetermined schedule is a look-up table that contains the critical times of events that are supposed to happen in order for the mail piece to be delivered to subsequent mail processing activities. If the mail piece meets all the critical times, it obtains an on-time code. The schedule is dependent upon a number of factors. First, the schedule depends on whether the mail piece is originating and whether the facility is a station. It may also depend on whether the mail piece is first-class, priority, or overnight. It may also depend on other factors.

For example, if the mail piece is first-class and originating at a station, then according to a predetermined schedule, the mail piece may need to be on a 6:00 p.m. truck headed for a plant.

If it is any time before 5:45 p.m. the mail piece is "on-time." If it is after 5:45 p.m., but before 6:00 p.m., then the mail piece is "ready." This indicates that a specific course of action must occur soon or the mail piece may miss the scheduled truck. If the time is after 6:15 p.m., then truck left the station and the mail piece is "late." If the mail piece misses the last truck available that day then it may be considered "dead."

The mail piece may be considered on-time until it is marked late. Also, it is possible that a mail piece may be simultaneously "ready" and "late" or simultaneously "ready" and "on-time." No matter where the mail piece is, if the current day is after the projected delivery date (calculated at step 1009), then the mail piece may be considered "dead." A real-time operator may correct a "late," "ready," "on-time," or "dead" code. Other possible codes may indicate that a mail piece is late or dead for the current or subsequent mail delivery process.

If the mail piece is originating (step 1015) and the facility is an AMC (i.e., not a station and not a plant) (step 1019), the system also determines an "on-time" code (step 1021). The on-time codes in an AMC may be are the same as in a station. Because an AMC has different operations than a station or a plant, the predetermined schedules are naturally different. In an AMC, it is important that mail pieces leave on time to be put on the correct departing airplane.

If the mail piece is originating (step 1015) and the facility is a plant (step 1019), the system determines if the mail piece is entering the plant (step 1022). The system can tell if the mail piece is entering a plant in a number of ways. For instance, if it is the first time there is data concerning the mail piece at this plant, then it may be assumed that the mail piece just arrived. If the mail piece is entering the plant, the system determines the on-time code using a different predetermined schedule (step 1024). Again, the predetermined schedules at a plant are different than at a station or an AMC because plants perform different functions. If the mail piece did not just enter the plant (step 1022), the system sets a different on-time code using a predetermined schedule (step 1026).

If the mail piece is not originating (step 1015) and if the facility is a plant (step 1027), the system determines whether the mail piece is an overnight mail piece (step 1028). If the mail piece is an overnight mail piece, the system determines an on-time code using a different predetermined schedule (step 1030). Otherwise, if the mail piece is not an overnight mail piece, the system uses a different predetermined schedule (step 1032). If the facility is a station (step 1033), the system determines an on-time code using a different predetermined schedule (step 1035). If the facility is not a station or a plant, then it must be an AMC, and the system determines an on-time code using a different predetermined schedule (step 1037).

The system then stores the on-time code in the database (step 1038). The system determines if the mail piece is leaving the facility (step 1039). The system may determine this by the location of the mail piece. If the mail piece is leaving the facility, the system records the time in the facility (step 1043) and also computes and stores the elapsed time in the database (step 1041). If, instead, the mail piece is just entering the facility (step 1042), the system records the arrival time and computes the trip time from the previous facility (step 1040) and stores the computed times in the database (step 1041). Next, the system returns to step 1013 for additional processing.

Figure 8:
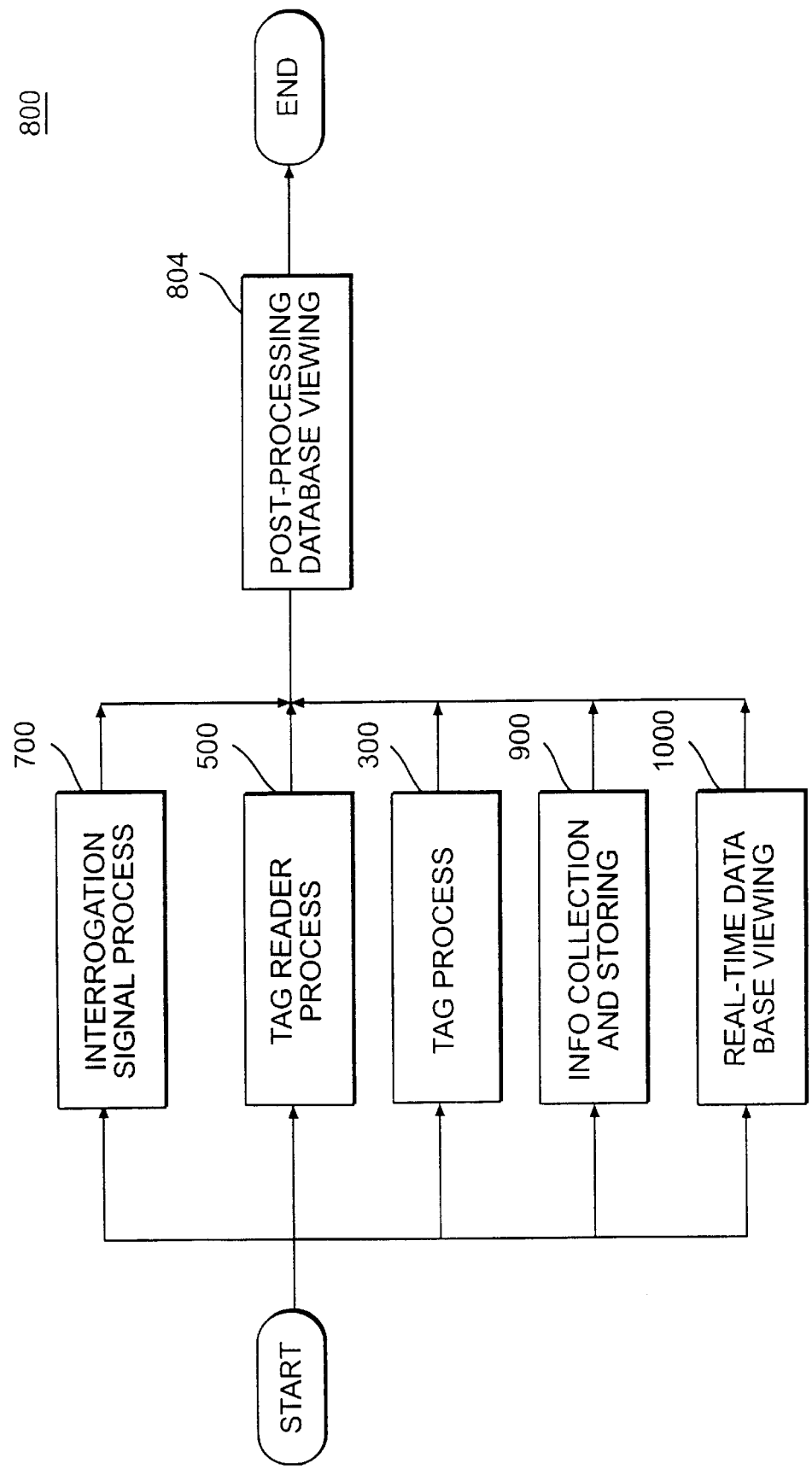
FIG. 8 is a flow chart of a parallel real-time process, consistent with this invention, for tracking and locating a mail piece.

FIG. 8 is a flow chart of a parallel real-time process, consistent with this invention, for tracking and locating the mail piece. In FIG. 8, the interrogation signal process 700, the tag-reader process 500, the tag process 300, the information collection and storage process 900, and the real-time database viewing process 1000 all operate in parallel. The database viewing process 804 can also be a post processing event.

Figure 11:
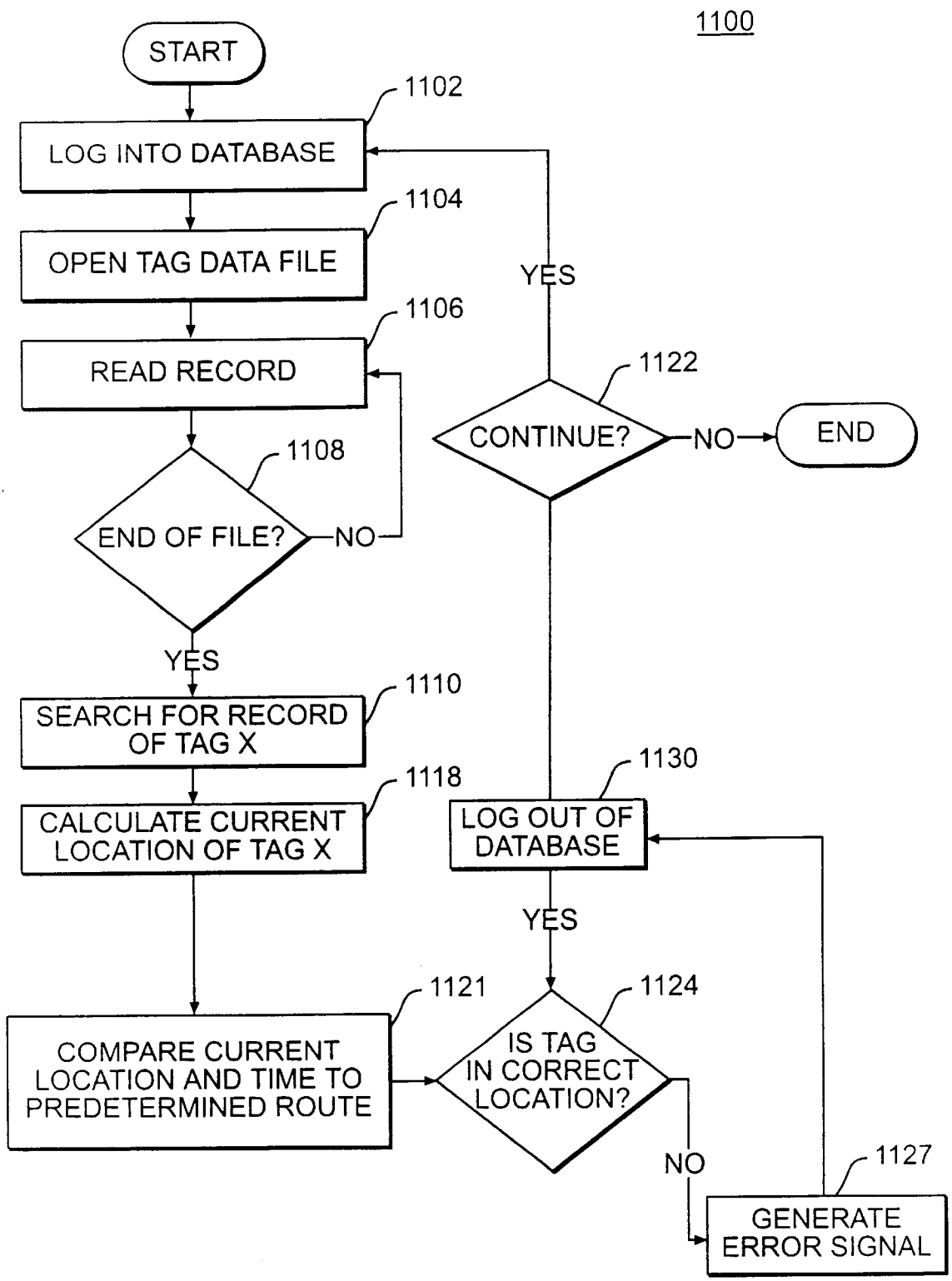
FIG. 11 is a flow chart of a process, consistent with this invention, for determining when a mail piece deviates from a predetermined route.

Methods and apparatus consistent with this invention for locating the mail piece may compare the tracked location of the mail piece with a predetermined route, and generate an error signal when the tracked location deviates from the predetermined route. FIG. 11 is a flow chart of a process 1100 for generating an error signal when the tracked location deviates from the predetermined route. Process 1100 is implemented by the system including application 609 controlling operation of processor 605 in computer 118. In process 1100, the system logs into a data base (step 1102), such as Oracle7, and opens the tag data file (step 1104). Memory 602 or secondary storage 604 may store the database. The system then reads tag records (step 1106) until it reaches the end of file (step 1108). The system then searches its memory for a predetermined tag (tag X) (step 1110), and calculates its location (step 1118). The system compares the current location and time to a predetermined route (step 1121) and determines whether tag X is in a correct location (step 1124). If tag X is not in the correct location, the system generates an error signal (step 1127). Then, the system logs out of the database (step 1130) and process 1100 may repeat (step 1122). The error signal generated in step 1127 may be sent to computer 118, or to one or more workstations in the location where tag X is physically located. In another embodiment, the error signal may also be transmitted to a pager or a telephone.

Methods and apparatus consistent with this invention for locating the mail piece may receive the response signal using a plurality of receivers, and locate the mail piece based upon the different signals received by each of the plurality of receivers. In the illustrated embodiment, to the extent that the transmission patterns 108–111 of the tag-readers overlap, multiple tag-readers may receive signals from mail piece 106. This allows the use of triangulation or other techniques to approximate the location of the mail piece within a particular sector. Other techniques are well known in the art and include calculations based on signal strength, signal direction, signal delay, or transmit pattern overlap.

Figure 12:
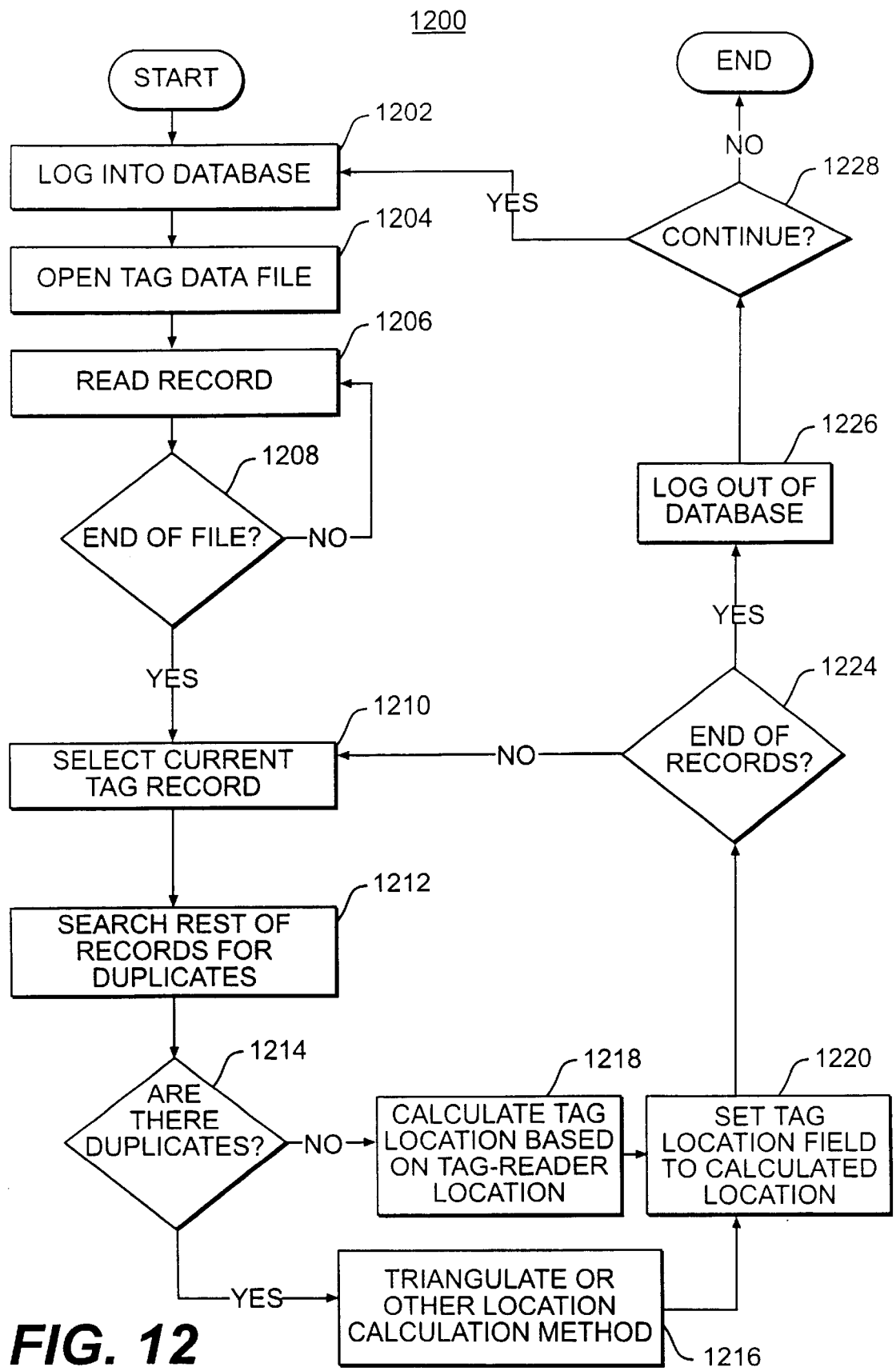
FIG. 12 is a flow chart of a process, consistent with this invention, for determining a location of a mail piece using multiple information signals.

FIG. 12 is a flow chart of a process 1200, consistent with this invention, for locating the mail piece using multiple information signals. Process 1200 is implemented by the system including application 609 controlling operation of processor 605 in computer 118. In process 1200, the system logs into a data base (step 1202), such as Oracle7, and opens the tag data file (step 1204). Memory 602 or secondary storage 604 may store the database. The system then reads tag records (step 1206) until it reaches the end of file (step 1208). The system then selects a current tag record (step 1210) and searches its memory for a duplicate record (step 1212). If there are multiple records, the system calculates the location of the tag-reader by triangulation or another location calculation method based on multiple records (step 1216). If there are no duplicate records (step 1214) then the system calculates the tag location based on the information in one record (step 1218). The system then sets the tag location field in the database to the calculated location (step 1220). If there are no more records to process (step 1224), then the system logs out of the data base (step 1226). The process 1200 may repeat (step 1228). If there are more records to process, then the system selects a new current tag record (1210) and repeats the process by searching for duplicate records (step 1212).

Methods and apparatus consistent with this invention for locating the mail piece may determine a time period when the mail piece should leave a particular location, and generate an error signal when the mail piece does not leave the particular location during the time period. In the illustrated embodiment, when mail piece 106 enters a sector, computer 118 can store the mail piece identification code and entry time in memory and then start a timer. If mail piece 106 has not moved after a predetermined amount of time, the system generates an error signal. A look-up table can be used to determine the maximum time the mail piece should remain within particular sectors.

For example, at a predetermined amount of time before a mail truck leaves a building, the system can "poll" an entire floor, that is, have all the tag-readers on that floor transmit a signal to all tags that may be on that floor. Computer 118 attached to network 117 stores a list of mail pieces that must be on the outgoing truck. If mail pieces should be on a truck but are not, the system may determine the location of mail pieces that are in danger of being left behind so that those mail pieces may be recovered and loaded onto the truck. The invention could also be used in this manner to ensure that all airline baggage is on the proper airplane and is not left in the airport. Similarly, the invention may be used to determine whether all equipment that should be loaded onto a transport ship has been loaded, and whether the equipment is in the correct march order for unloading.

Figure 13:
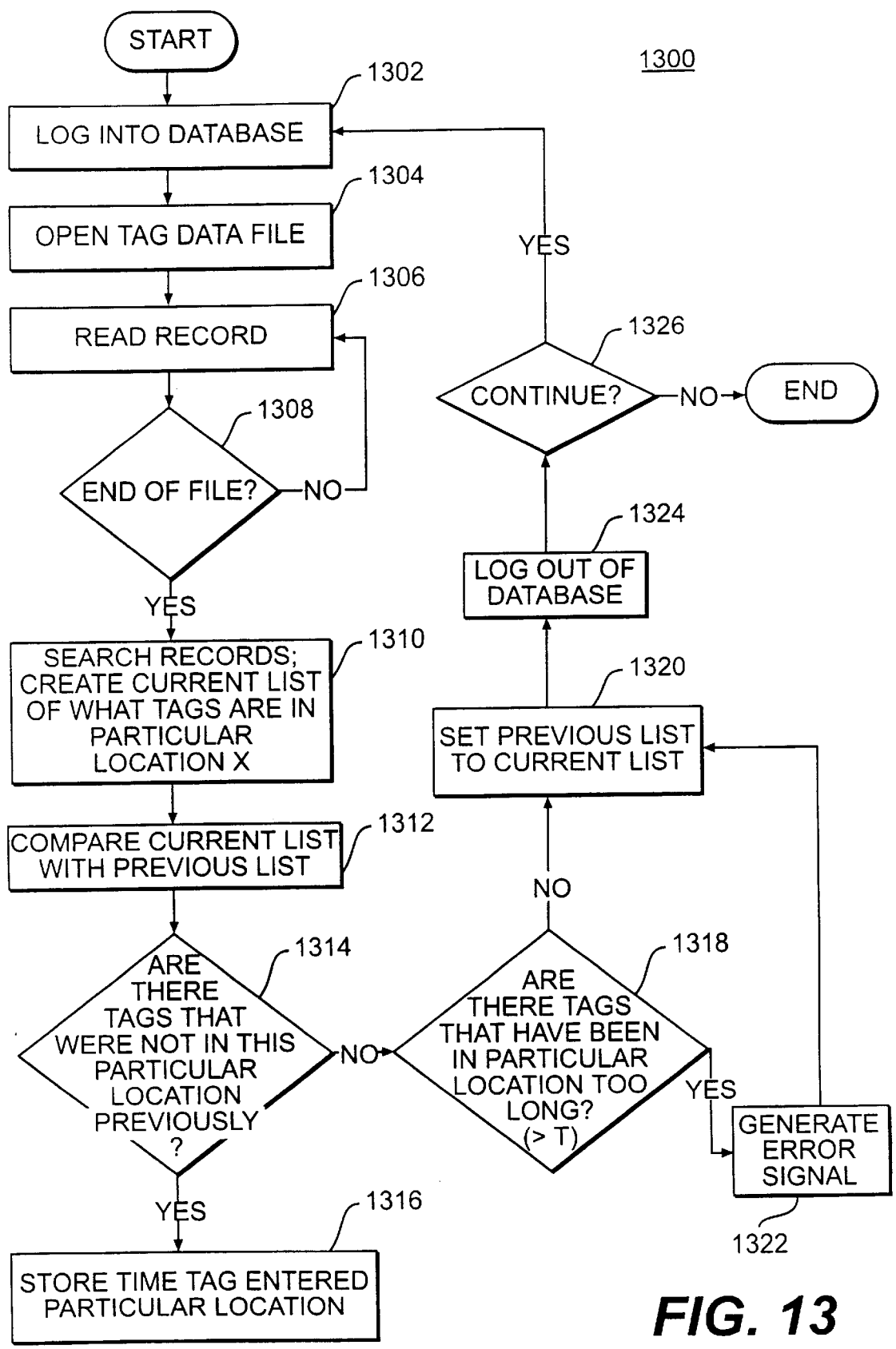
FIG. 13 is a flow chart of a process, consistent with this invention, for generating an error signal when a mail piece is in a particular location for too long.

FIG. 13 is a flow chart of a process 1300 for generating an error signal when the article does not leave the particular location during a predetermined time period. Process 1300 is implemented by the system including application 609 controlling operation of processor 605 in computer 118. In process 1300, the system logs into a data base (step 1302), such as Oracle7, and opens a tag data file (step 1304). Memory 602 or secondary storage 604 may store the database. The system then reads tag records (step 1306) until it reaches the end of file (step 1308). The system then searches its memory and creates a current list of what tags are in a particular location X (step 1310). The system then compares this current list with a previous list of tags in location X. If there are tags that are in location X in the current list that are not in the previous list (step 1314), then the system stores the approximate time these new tags must have entered location X (step 1316). If there is a tag that has been in a particular location too long (step 1318), then the system generates an error signal (step 1322). The system may determine if a tag has been in the particular location too long by searching a look-up table and comparing the time a tag has been in the particular location with a maximum allowable time. Then, the system sets the previous list to the current list (step 1320) and logs out of the database (step 1324). The process then may repeat itself (step 1326).

Methods and apparatus consistent with this invention for locating and evaluating the mail piece may determine a time period when the mail piece should not be in a particular location, and generate an error signal if the mail piece is in the particular location during the time period. In the illustrated embodiment, it is possible to monitor sectors in which the mail piece should never reside. If the mail piece is detected in a sector where it should not be, an error signal is generated. For example, the mail piece should never be in an employee locker room or a janitor's closet. In another scenario it is possible that the mail piece is not allowed in certain sectors during certain times of the day. For instance, if the mail piece is destined for Chicago, it should not be in a staging area for a flight to New York, and the system would generate an error signal.

Figure 14:
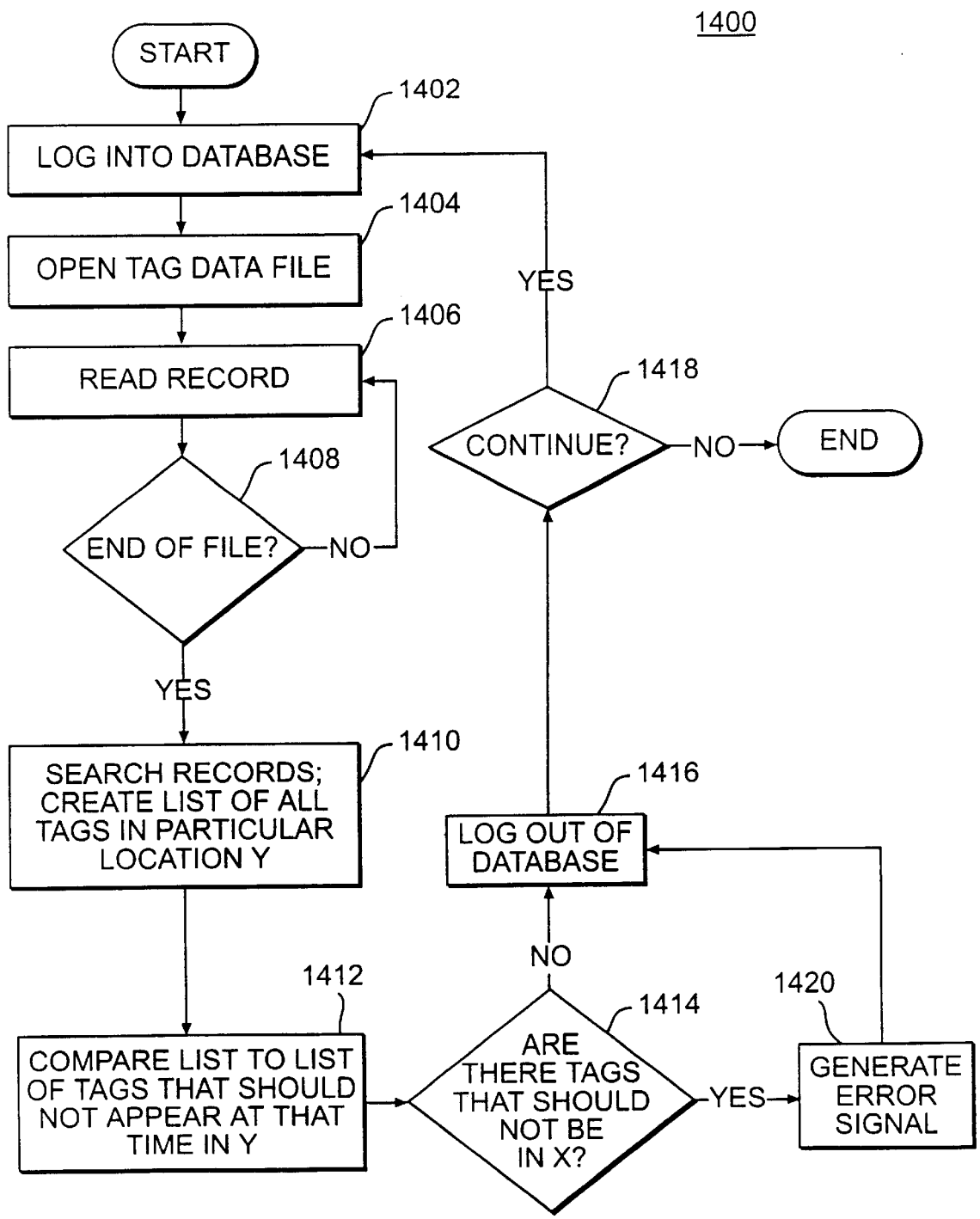
FIG. 14 is a flow chart of a process, consistent with this invention, for generating an error signal when a mail piece is in a particular location in which it should not be.

FIG. 14 is a flow chart of a process 1400, consistent with this invention, for generating an error signal when the mail piece should not be in a particular location and it is in that particular location. Process 1400 is implemented by the system including application 609 controlling operation of processor 605 in computer 118. In process 1400, the system logs into a data base (step 1402), such as Oracle7, and opens a tag data file (step 1404). Memory 602 or secondary storage 604 may store the database. The system then reads tag records (step 1406) until it reaches the end of file (step 1408). The system then searches its memory for records and creates a list of all tags in a particular location Y (step 1410). The system compares this list to a list of all tags that should not appear at that time in location Y (step 1412). If there are tags that are in location Y that should not be there at that time (step 1414), then the system generates an error signal (step 1420). Then, the system logs out of the database (step 1416) and the process 1400 may repeat itself (step 1418).

Methods and apparatus consistent with this invention for locating the mail piece may determine a time period when the mail piece should not leave a particular location, and generate an error signal when the mail piece leaves the particular location during a time period. In another embodiment, if a tag is hidden in a piece of framed art in a museum (or any object), the system would detect when that piece of art left a physical location (such as a wall) and would generating an error signal. In this embodiment, a look-up table may have locations where the object should be. These locations in the look-up table may be determined accurately by triangulation when the object is known to be in these locations.

Figure 15:
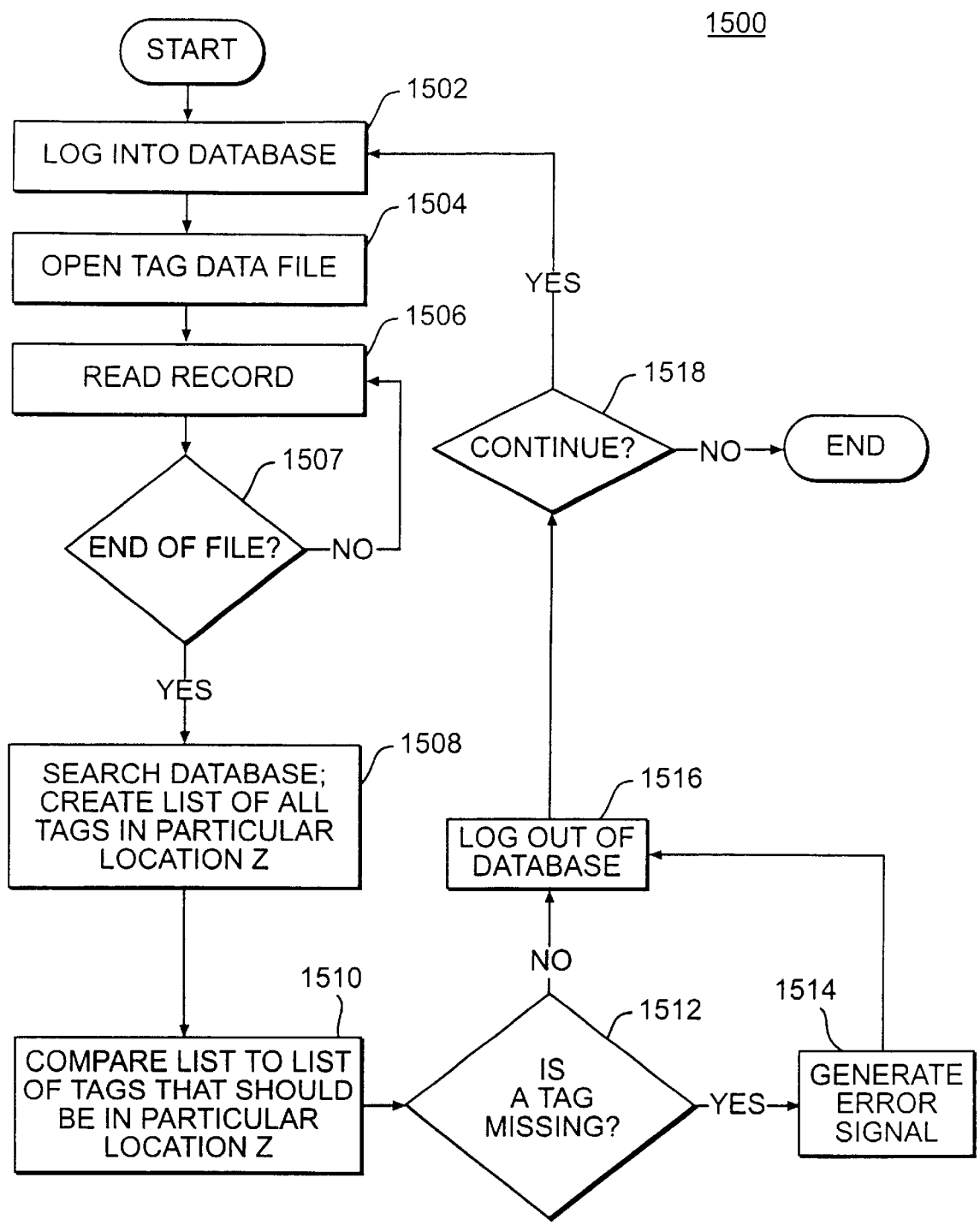
FIG. 15 is a flow chart of a process, consistent with this invention, for generating an error signal when a mail piece leaves a particular location during a time period.

FIG. 15 is a flow chart of a process 1500, consistent with this invention for generating an error signal when the mail piece leaves a particular location during a time period. Process 1500 is implemented by a system including application 609 controlling operation of processor 605 in computer 118. In process 1500, the system logs into a data base (step 1502), such as Oracle7, and opens a tag data file (step 1504). Memory 602 or secondary storage 604 may store the database. The system then reads tag records (step 1506) until it reaches the end of file (step 1507). The system then searches its memory for records and creates a list of all tags in a particular location Z (step 1508). The system compares this list to a list of all tags that should appear at that time in location Z (step 1510). If there is a tag that is not in location Z that should be there at that time (step 1512), then the system generates an error signal (step 1514). The system may also compare this list of tags in location Z to a database that contains departure times for tags. If a tag on the list for location Z is scheduled to depart location Z within a time period (a few minutes for example) the system may also generate an error signal (step 1514). Then, the system logs out of the database (step 1516) and the process then may repeat itself (step 1518).

In processes 1100, 1300, 1400, and 1500 (FIGS. 11, 13, 14, and 15), the steps of (1) whether a tag is in the correct location (step 1124), (2) whether there are tags that have been in a particular location too long (step 1318), (3) whether there are tags that should not be in a location (step 1414), or (4) whether a tag is missing or is within minutes of a required departure (step 1512), may depend on a number of conditions. These conditions may include (1) whether the mail piece is Express Mail™, bulk mail, etc., (2) whether the mail piece is originating or not, or (3) whether the mail piece is on-time, late, ready, or dead. These conditions may be determined by process 1000 in FIGS. 10A–10C.

Methods and apparatus consistent with this invention for locating the mail piece may turn on a camera after receiving a response signal. The method or apparatus may also move a camera in response to the tracked location of the mail piece. In the illustrated embodiment, mail piece 106 may travel from sector 1 to sector 2 to sector 3 to sector 4. The system could provide the means to activate each security camera 133, 130, 132, and 131, respectively, as the mail piece travels through each sector. The invention could also provide the servo motors attached to a moveable pan, tilt and zoom camera with information to follow mail piece 106.

A camera that could be used for this purpose is AUTODOME™, which is available from Burle Technologies, Inc. This camera is a radio controlled pan, tilt, and zoom camera that may use a wireline for control of the movement. Pointing and focusing can be done manually, using a joy stick, or automatically, using preprogrammed instructions. In one embodiment of this invention, this routine can be dynamic and self actuating. In another embodiment, error signals generated by the system may cause cameras 130–133 to be turned on, and the object may be tracked as it moves. The video may be tape recorded.

It is apparent to those skilled in the art that various modifications and variations can be made in the embodiment of this invention and in the construction of this invention without departing from the scope or spirit of the invention. For instance, any type of moveable article can be tracked, not just mail pieces. For example, containers containing mail pieces could also be tracked. Types of moveable articles may include, but are not limited to, luggage, framed-art, vehicles, or work pieces in a building. Further, various types of tags and tag-readers, supplied by different vendors, may be used without departing from the scope of the invention.

As another example, although computer 118 is depicted with various components, one skilled in the art appreciates that computer 118 can contain additional or different components. Additionally, although computer 118 is shown connected to network 117, computer 118 may be connected to other networks, including other wide area networks or local area networks. Furthermore, although aspects of this invention are described as being stored in memory, one skilled in the art appreciates that these aspects can also be stored on or read from other types of computer program products or computer-readable media, such as secondary storage devices, including video tape, hard disks, floppy disks, or CD-ROM; a carrier wave from a network such as the Internet; or other forms of RAM or ROM. These aspects of this invention may also include modules, implemented in software, hardware, or a combination, configured to perform a particular method implementing an embodiment consistent with this invention. In addition, the computer-readable media may include instructions for controlling a computer system, such as computer 118, to perform a particular method.

As another example, transmission patterns 108–111 displayed in FIG. 1 could be larger or smaller. Transmission patterns 108–111 could also be small to prevent overlapping at all. Further, transmission patterns do not have to be symmetrical in any way. For instance, the transmission patterns 108–111 could be directional, as to only cover only a portion of three hundred sixty degrees. Further, in the discussion above it is assumed that tag-reader's 102–105 receive patterns are symmetrical. They too could be directional receivers.

Other embodiments of the invention are apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-readable medium containing instructions for controlling a computer system to perform a method of operating a processor to determine a location of a moveable article, the method comprising the steps of:

repeatedly instructing the transmission of an interrogation signal, wherein the article receives the interrogation signal and transmits a response signal, the response signal providing a unique identification code, wherein at least one of a plurality of receivers receives the response signal, each receiver having a unique receiver code;

receiving from at least one of the plurality of receivers a plurality of information signals providing the identification code and a corresponding receiver code;

recording the plurality of information signals in real-time over a period of time;

tracking the location of the article in real-time;

comparing the tracked location of the article with a predetermined route; and generating an error signal when the tracked location deviates from the predetermined route.

2. The computer-readable medium of claim 1, wherein the plurality of information signals are received from at least two of the plurality of receivers.

3. The computer-readable medium of claim 1, wherein the step of comparing includes determining a time period when the article should leave a particular location; and wherein the step of generating generates an error signal when the article does not leave the particular location during the time period.

4. The computer-readable medium of claim 1, wherein the step of comparing includes determining a time period when the article should not be in a particular location; and wherein the step of generating generates an error signal if the article is in the particular location during the time period.

5. The computer-readable medium of claim 1, wherein the step of comparing includes determining a time period when the article should not leave a particular location, and wherein the step of generating generates an error signal when the article leaves the particular location during the time period.

6. The computer-readable medium of claim 1, wherein the method further comprises instructing a camera to turn on in response to one of the plurality of information signals.

7. The computer-readable medium of claim 1, wherein the method further comprises instructing a camera to move in response to the location of the article.

8. The computer-readable medium of claim 1, wherein the plurality receiving step includes receiving the plurality of information signals from at least three of the plurality of receivers.

9. The computer-readable medium of claim 1, wherein the predetermined route includes a predetermined location and a time period that the article is to be in the predetermined location;

and wherein the step of comparing includes comparing the tracked location to the predetermined location and the time period.

10. The computer-readable medium of claim 9, wherein the step of generating an error signal includes generating an error signal when the article is not in the predetermined location during the time period.

11. The computer-readable medium of claim 9, wherein the step of generating an error signal includes generating an error signal when the article is in the predetermined location outside the time period.

12. The computer-readable medium of claim 1, wherein the moveable article is a piece of equipment to be loaded onto a transport ship, and wherein the method ensures that the piece of equipment is placed on the transport ship in a correct order relative to one or more other pieces of equipment.

* * * * *